United States Patent
Peng et al.

(10) Patent No.: US 12,450,842 B2
(45) Date of Patent: Oct. 21, 2025

(54) SYSTEMS AND METHODS FOR RENDERING AN AUGMENTED REALITY OBJECT WITH ADAPTIVE ZOOM FEATURE

(71) Applicant: Perfect Mobile Corp., New Taipei (TW)

(72) Inventors: Hsin-Yi Peng, Kaohsiung (TW); Chih-Yu Cheng, Taipei (TW)

(73) Assignee: PERFECT MOBILE CORP., New Taipei (TW)

( * ) Notice: Subject to any disclaimer, the term of this patent is extended or adjusted under 35 U.S.C. 154(b) by 192 days.

(21) Appl. No.: 18/362,498

(22) Filed: Jul. 31, 2023

(65) Prior Publication Data
US 2024/0062484 A1    Feb. 22, 2024

Related U.S. Application Data

(60) Provisional application No. 63/371,535, filed on Aug. 16, 2022.

(51) Int. Cl.
*G06T 19/00* (2011.01)
*G06T 3/40* (2006.01)
*G06T 7/70* (2017.01)

(52) U.S. Cl.
CPC .............. *G06T 19/006* (2013.01); *G06T 3/40* (2013.01); *G06T 7/70* (2017.01); *G06T 2207/30196* (2013.01)

(58) Field of Classification Search
None
See application file for complete search history.

(56) References Cited

U.S. PATENT DOCUMENTS

| | | |
|---|---|---|
| 6,310,627 B1 | 10/2001 | Sakaguchi |
| 7,196,733 B2 | 3/2007 | Aratani et al. |
| 7,469,064 B2 | 12/2008 | Furuya et al. |
| 7,542,050 B2 | 6/2009 | Kramer et al. |
| 8,203,601 B2 | 6/2012 | Kida et al. |
| 11,170,210 B2 | 11/2021 | Wang et al. |
| 2015/0292864 A1 | 10/2015 | Kirschner et al. |

(Continued)

FOREIGN PATENT DOCUMENTS

| | | |
|---|---|---|
| CN | 108229277 B | 5/2020 |
| CN | 107705348 B | 12/2020 |
| CN | 113421182 A | 9/2021 |

OTHER PUBLICATIONS

Gunes, S., et al.; "Augmented Reality Tool for Markerless Virtual Try-on around Human Arm;" 2015 IEEE International Symposium on Mixed and Augmented Reality—Media, Art, Social Science, Humanities and Design; Sep.-Oct. 2015; pp. 59-60.

(Continued)

*Primary Examiner* — Robert J Craddock
(74) *Attorney, Agent, or Firm* — McClure, Qualey & Rodack, LLP (57) ABSTRACT

A computing device obtains, using a camera of the computing device, an image depicting a hand at an initial zoom scale and estimates a pose of the hand depicted in the image. The computing device determines a distance between the hand and the camera of the computing device and adjusts the zoom scale based on the distance between the hand and the camera of the computing device. The computing device renders an augmented reality object on the hand depicted in the image according to the adjusted zoom scale and the pose of the hand depicted in the image.

14 Claims, 11 Drawing Sheets

(56) References Cited

U.S. PATENT DOCUMENTS

2016/0320863 A1  11/2016  Shimoda
2022/0075458 A1   3/2022  Powderly et al.
2022/0206298 A1   6/2022  Goodman

OTHER PUBLICATIONS

Extended European Search Report dated Feb. 1, 2024, issued in application No. EP 23191756.8.
Choi, J., et al.; "iHand: an interactive bare-hand-based augmented reality interface on commercial mobile phones;" Optical Engineering; Feb. 2013; pp. 027206-1 thru 027206-10.

Second object distance ($D_2$)

Second measured area ($A_2$)

(INITIAL ZOOM LEVEL)

(ADJUSTED ZOOM LEVEL)

SYSTEMS AND METHODS FOR RENDERING AN AUGMENTED REALITY OBJECT WITH ADAPTIVE ZOOM FEATURE

CROSS-REFERENCE TO RELATED APPLICATION

This application claims priority to, and the benefit of, U.S. Provisional Patent Application entitled, "Adaptive Zoom Method for Virtual Try-on," having Ser. No. 63/371,535, filed on Aug. 16, 2022, which is incorporated by reference in its entirety.

TECHNICAL FIELD

The present disclosure generally relates to systems and methods for rendering an augmented reality object with adaptive zoom feature.

SUMMARY

In accordance with one embodiment, a computing device obtains, using a camera of the computing device, an image depicting a hand at an initial zoom scale and estimates a pose of the hand depicted in the image. The computing device determines a distance between the hand and the camera of the computing device and adjusts the zoom scale based on the distance between the hand and the camera of the computing device. The computing device renders an augmented reality object on the hand depicted in the image according to the adjusted zoom scale and the pose of the hand depicted in the image.

In accordance with another embodiment, a computing device obtains, using a camera of the computing device, an image depicting a hand at an initial zoom scale and estimates a pose of the hand depicted in the image. The computing device determines an area occupied by the hand in the image and determines a ratio of the area occupied by the hand to an entire area of the image. The computing device adjusts the zoom scale based on the ratio of the area occupied by the hand to an entire area of the image. The computing device renders an augmented reality object on the hand depicted in the image according to the adjusted zoom scale and the pose of the hand depicted in the image.

In accordance with another embodiment, a computing device obtains, using a camera of the computing device, an image depicting a hand at an initial zoom scale and estimates a pose of the hand depicted in the image and obtains a size of the image. The computing device determines an orientation of the wrist in the image. The computing device determines a first width of the wrist and determines a second width of the wrist according to the orientation of the wrist in the image and the first width of the wrist. The computing device adjusts the zoom scale based on the second width of the wrist and the size of the image and renders an augmented reality object on the hand depicted in the image according to the adjusted zoom scale and the pose of the hand depicted in the image.

Another embodiment is a system that comprises a camera, a memory storing instructions, and a processor coupled to the memory. The processor is configured by the instructions to obtain, using the camera, an image depicting a hand at an initial zoom scale and estimate a pose of the hand depicted in the image. The processor is further configured to determine a distance between the hand and the camera and adjust the zoom scale based on the distance between the hand and the camera of the computing device. The processor is further configured to render an augmented reality object on the hand depicted in the image according to the adjusted zoom scale and the pose of the hand depicted in the image.

Another embodiment is a non-transitory computer-readable storage medium storing instructions to be implemented by a computing device. The computing device comprises a processor, wherein the instructions, when executed by the processor, cause the computing device to obtain, using a camera of the computing device, an image depicting a hand at an initial zoom scale and estimate a pose of the hand depicted in the image. The processor is further configured by the instructions to determine a distance between the hand and the camera of the computing device and adjust the zoom scale based on the distance between the hand and the camera of the computing device. The processor is further configured by the instructions to render an augmented reality object on the hand depicted in the image according to the adjusted zoom scale and the pose of the hand depicted in the image.

Other systems, methods, features, and advantages of the present disclosure will be apparent to one skilled in the art upon examining the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure are better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

The subject disclosure is now described with reference to the drawings, where like reference numerals are used to refer to like elements throughout the following description. Other aspects, advantages, and novel features of the disclosed subject matter will become apparent from the following detailed description and corresponding drawings.

There is a need for an improved way for allowing individuals to view details of virtual objects while experiencing augmented reality. When an individual wishes to view finer details of a virtual object displayed, for example, on the individual's hand, the individual must typically bring the individual's hand closer to the camera. However, in some cases, this is not desirable since accurate tracking of the individual's hand is needed in order to depict accurate presentation of the virtual object on the individual's hand. Bringing the individual's hand closer to the camera could result in portions of the individuals hand (e.g., the fingers of the individual's hand) falling outside the field of view of the camera, thereby potentially affecting tracking of the individual's hand. Ultimately, this could affect the augmented reality experience for the user. The present disclosure is directed to systems and methods for rendering an augmented reality object with adaptive zoom feature whereby the zoom scale is automatically increased or decreased based on movement of the individual's hand while allowing the individual's hand to remain in the field of view of the camera, thereby ensuring accurate tracking of the individual's hand.

Figure 1:
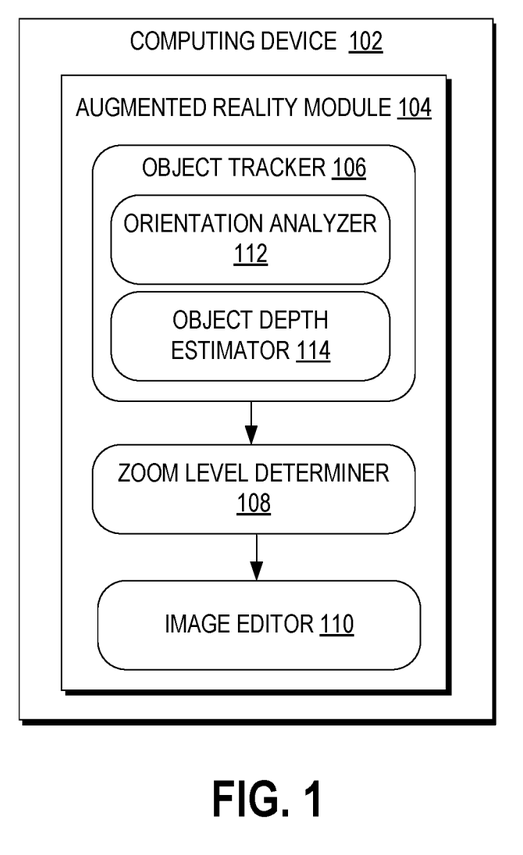
FIG. 1 is a block diagram of a computing device configured to render an augmented reality object with adaptive zoom feature according to various embodiments of the present disclosure.

A description of a system for rendering an augmented reality object with adaptive zoom feature is described followed by a discussion of the operation of the components within the system. FIG. 1 is a block diagram of a computing device 102 in which the embodiments disclosed herein may be implemented. The computing device 102 may comprise one or more processors that execute machine executable instructions to perform the features described herein. For example, the computing device 102 may be embodied as a computing device such as, but not limited to, a smartphone, a tablet-computing device, a laptop, and so on.

An augmented reality module 104 executes on a processor of the computing device 102 and includes an object tracker 106, a zoom level determiner 108, and an image editor 110. The object tracker 106 is configured to obtain digital images of a user's hand and displays the user's hand on a display of the computing device 102 at an initial zoom level. The object tracker 106 is further configured to track the user's hand in the image, thereby allowing the image editor 110 to render an augmented reality object (e.g., a watch) on the user's hand at the initial zoom level. For some embodiments, the object tracker 106 is configured to cause a camera (e.g., rear-facing camera) of the computing device 102 to capture an image or a video of the user of the computing device 102. Alternatively, the computing device 102 may be equipped with the capability to connect to the Internet, and the object tracker 106 may be configured to obtain an image or video of the user from another device or server.

The images obtained by the object tracker 106 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. The video may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

For some embodiments, the object tracker 106 includes an orientation analyzer 112 configured to determine the orientation of the wrist of the user's hand depicted in the image. The object tracker 106 determines the width of the user's hand based on the orientation of the user's hand. The zoom scale is then automatically adjusted based on the width of the wrist. The object tracker 106 may also include an object depth estimator 114 configured to determine the distance between the user's hand and the computing device 102. For some embodiments, the distance between the hand and the computing device 102 comprises an absolute distance or a relative distance. In particular, the distance comprises the absolute distance or the relative distance between the hand and a camera (e.g., rear-facing camera) of the computing device 102. For some embodiments, the zoom level determiner 108 is configured to adjust the zoom scale to be inversely proportional to the distance between the hand and the computing device.

The object depth estimator 114 may also be configured to determine an area occupied by the hand in the image and determine a ratio of the area occupied by the topside of the hand to an entire area of the image, where the zoom level determiner 108 adjusts the zoom scale based on this ratio. For some embodiments, the object depth estimator 114 is configured to determine the locations of two points on the hand in the image and determine the distance between the two points on the hand. The zoom level determiner 108 then adjusts the zoom scale based on the distance between the two points on the hand. The two points are determined based on any two points tracked on the hand where the two points can be predefined. For some embodiments, the two points may be defined by one or more features of the user such as a mole or a scar on the hand.

The image editor 110 is configured to render an augmented reality object on the hand in the image according to the adjusted zoom scale set by the zoom level determiner 108. For some embodiments, this image editor 110 renders the augmented reality object by generating a modified image where the image editor 110 crops the image according to the zoom scale. The image editor 110 then renders the augmented reality object on the hand in the modified image and displays the modified image with the rendered augmented reality object. For some embodiments, the image editor 110 renders the augmented reality object by rendering the augmented reality object on the hand in the image. The image editor 110 then generates a modified image by cropping the image with the rendered augmented reality object and displays the modified image with the rendered augmented reality object.

Figure 2:
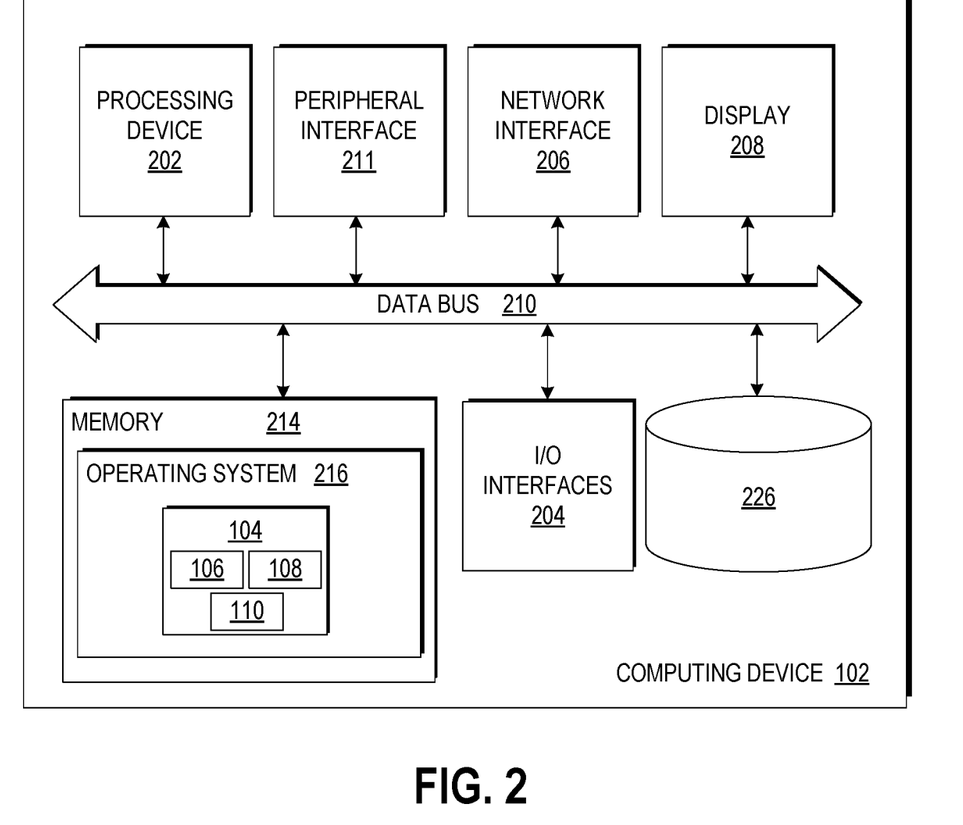
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM) such as DRAM and SRAM) and nonvolatile memory elements (e.g., ROM, hard drive, tape, CDROM). The memory 214 typically comprises a native operating system 216, one or more native applications, emulation systems, or emulated applications for any of a variety of operating systems and/or emulated hardware platforms, emulated operating systems, etc. For example, the applications may include application specific software that may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
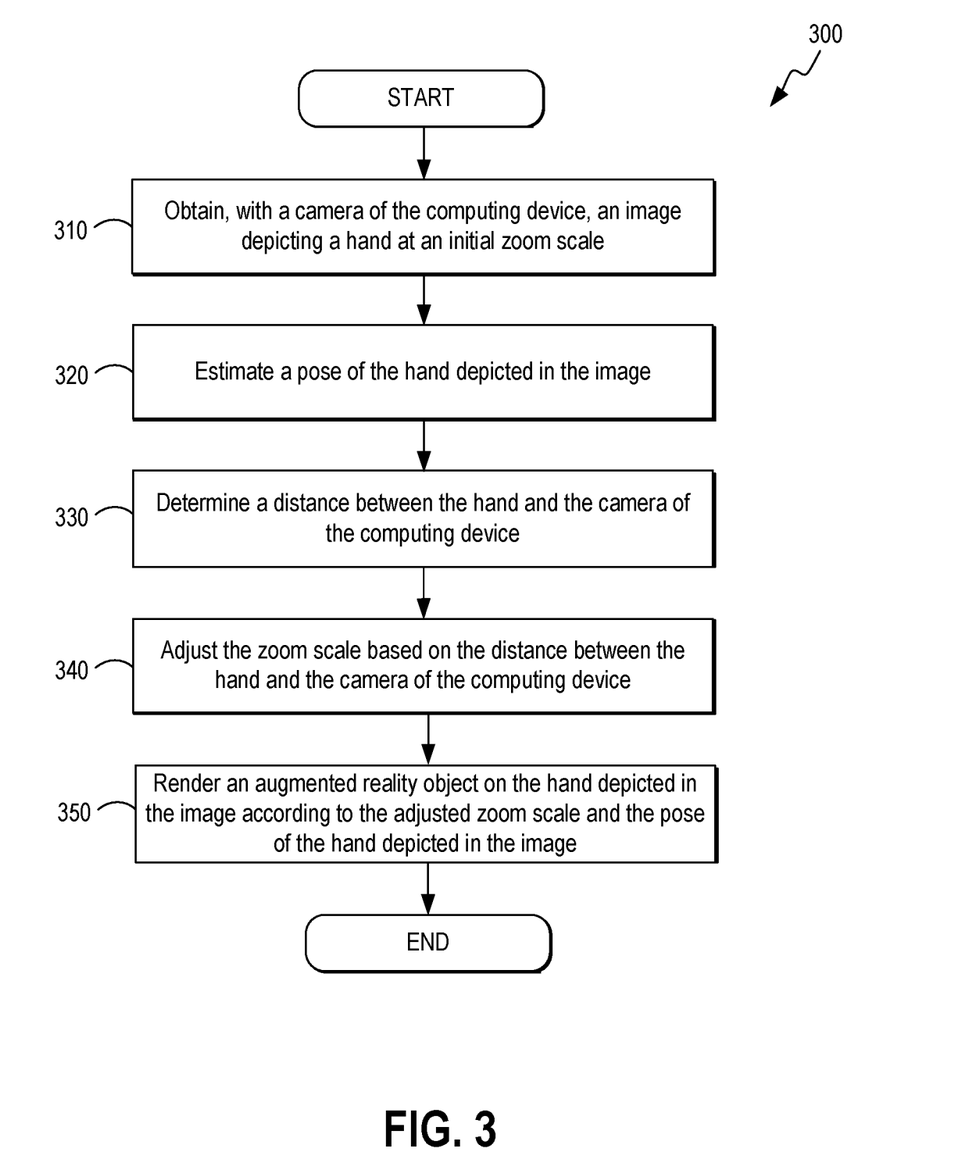
FIG. 3 is a top-level flowchart illustrating examples of functionality implemented as portions of the computing device of FIG. 1 for rendering an augmented reality object with adaptive zoom feature according to various embodiments of the present disclosure.

Reference is made to FIG. 3, which is a flowchart 300 in accordance with various embodiments for rendering an augmented reality object with adaptive zoom feature, where the operations are performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. In addition, two or more blocks shown in succession in FIG. 3 may be executed concurrently or with partial concurrence. It is understood that all such variations are within the scope of the present disclosure.

At block 310, the computing device 102 obtains, using a camera of the computing device 102, an image depicting a hand. At block 320, the computing device 102 estimates a pose of the hand depicted in the image. For some embodiments, the pose of the hand in the image comprises a position and an angle of the hand.

At block 330, the computing device 102 determines the distance between the hand and the camera of the computing device 102. For some embodiments, the computing device 102 determines the distance between the hand and the camera by obtaining a size of the image and determining an orientation of the wrist in the image. The computing device 102 determines a first width of the wrist and determines a second width of the wrist according to the orientation of the wrist in the image and the first width of the wrist. The computing device 102 then determines the distance between the hand and the camera based on a ratio of the second width of the wrist and the size of the image.

For some embodiments, the computing device 102 determines the distance between the hand and the camera by determining an area occupied by the hand in the image and determining a ratio of the area occupied by the hand to an entire area of the image, where the zoom scale is adjusted based on the ratio. For some embodiments, the computing device 102 determines the distance between the hand and the camera by determining locations of two points on the hand in the image. The computing device 102 then determines a distance between the two points on the hand in the image, where the zoom scale is adjusted based on the distance between the two points on the hand in the image.

At block 340, the computing device 102 adjusts the zoom scale based on the distance between the hand and the camera of the computing device 102. For embodiments where the computing device 102 determines the positioning of the hand by determining a distance between the hand and the computing device 102, the computing device 102 adjusts the zoom scale by adjusting the zoom scale to be inversely proportional to the distance between the hand and the computing device 102. For some embodiments, the distance is determined based on depth information, which may be derived based on estimations generated by an artificial intelligence mode, structure from a motion method, or use of a depth sensor.

At block 350, the computing device 102 renders an augmented reality object on the hand depicted in the image according to the adjusted zoom scale and the pose of the hand depicted in the image. For some embodiments, the computing device 102 renders the augmented reality object on the hand in the image according to the adjusted zoom scale by generating a modified image, cropping the image according to the zoom scale, and rendering the augmented reality object on the hand in the modified image. The computing device 102 then displays the modified image with the rendered augmented reality object.

In other embodiments, the computing device 102 renders the augmented reality object on the hand in the image according to the adjusted zoom scale by rendering the augmented reality object on the hand in the image and generating a modified image by cropping the image with the rendered augmented reality object. The computing device 102 then displays the modified image with the rendered augmented reality object. Thereafter, the process in FIG. 3 ends.

Figure 4:
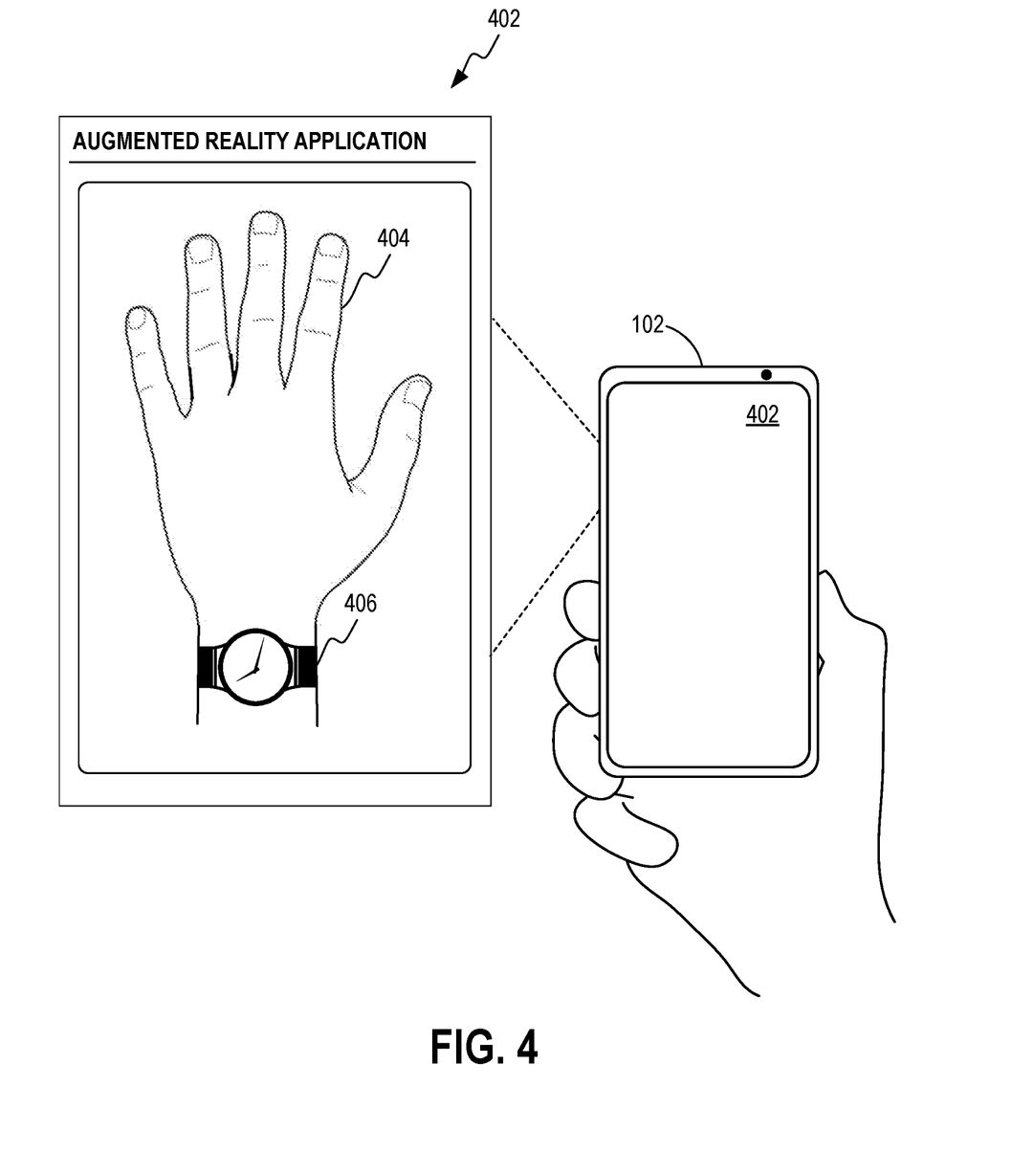
FIG. 4 illustrates an example user interface provided on a display of the computing device according to various embodiments of the present disclosure.

To illustrate further various aspects of the present invention, reference is made to the figures described below. FIG. 4 illustrates an example user interface 402 provided on a display of the computing device 102 whereby an image of the user's hand 404 is captured and displayed to the user. As described above, the object tracker 106 (FIG. 1) executing in the computing device 102 can be configured to cause a camera of the computing device 102 to capture an image or a video of a user's hand 404 for purposes of rendering an augmented reality object 406 on the hand 404 in the image. In the example shown, the augmented reality object 406 comprises a watch located on the user's wrist, where the image of the user's hand 404 and the augmented reality object 406 are displayed in the user interface 402 at an initial zoom level. Depending on how close the user's hand 404 is to the camera of the computing device 102, finer details on the augmented reality object 406 (the details of the watch face, the texture of the watch bezel, etc.) may not be viewable to the user at the initial zoom level. The following figures illustrate different ways for allowing the user to increase the zoom level by adjusting the positioning of the user's hand while keeping the user's hand within the field of view of the camera in the computing device 102.

Figure 5:
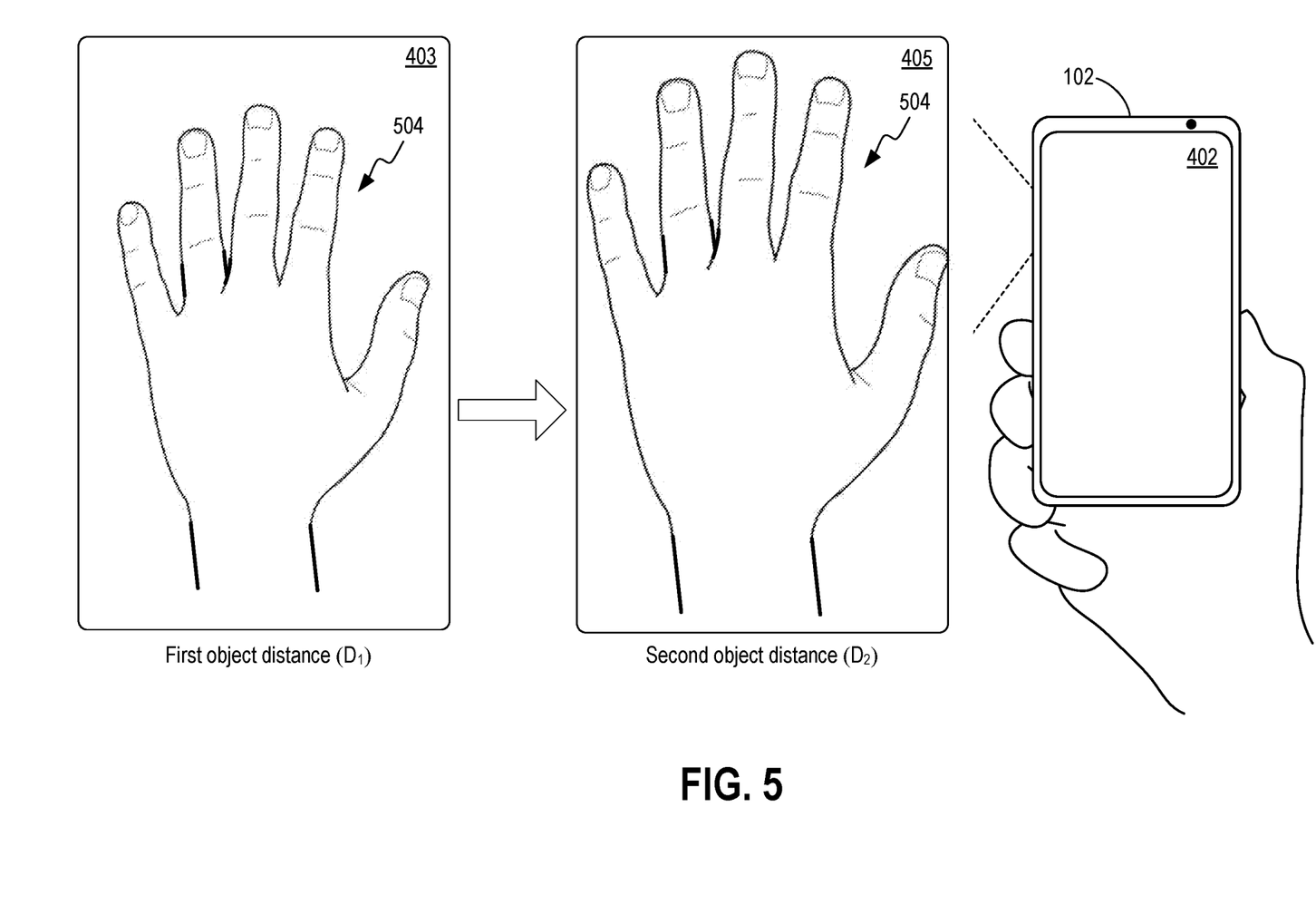
FIG. 5 illustrates the user adjusting the zoom level by transitioning the user's hand from a first object distance to a second object distance according to various embodiments of the present disclosure.

FIG. 5 illustrates the user adjusting the zoom level by transitioning the user's hand 504 from a first object distance to a second object distance. In the example shown, two images 403, 405 of the user' hand are taken by the camera where the user's hand is positioned at different distances from the camera. In the example user interface 402 shown on the computing device 102, the user's hand is initially at a first object distance ($D_1$) where the distance is measured between the user's hand 504 and the camera of the computing device 102. As discussed above, the user's hand 504 is displayed to the user at an initial zoom level in the user interface 402, which may not be adequate for viewing some of the finer details of the augmented reality object (i.e., watch). However, bringing the user's hand too close to the camera may result in the fingers of the user's hand falling outside the field of view of the camera, thereby potentially affecting tracking of the user's hand. This could ultimately affect rendering of the augmented reality object 506 on the user's hand 504 and affecting the overall augmented reality experience for the user. To remedy this, the embodiments disclosed herein allow the user to move the user's hand 504 to a second object distance ($D_2$) such that the second object distance ($D_2$) is less than the first object distance ($D_1$) but where the user's entire 504 is still within the field of view of the camera of the computing device 102.

Figure 6:
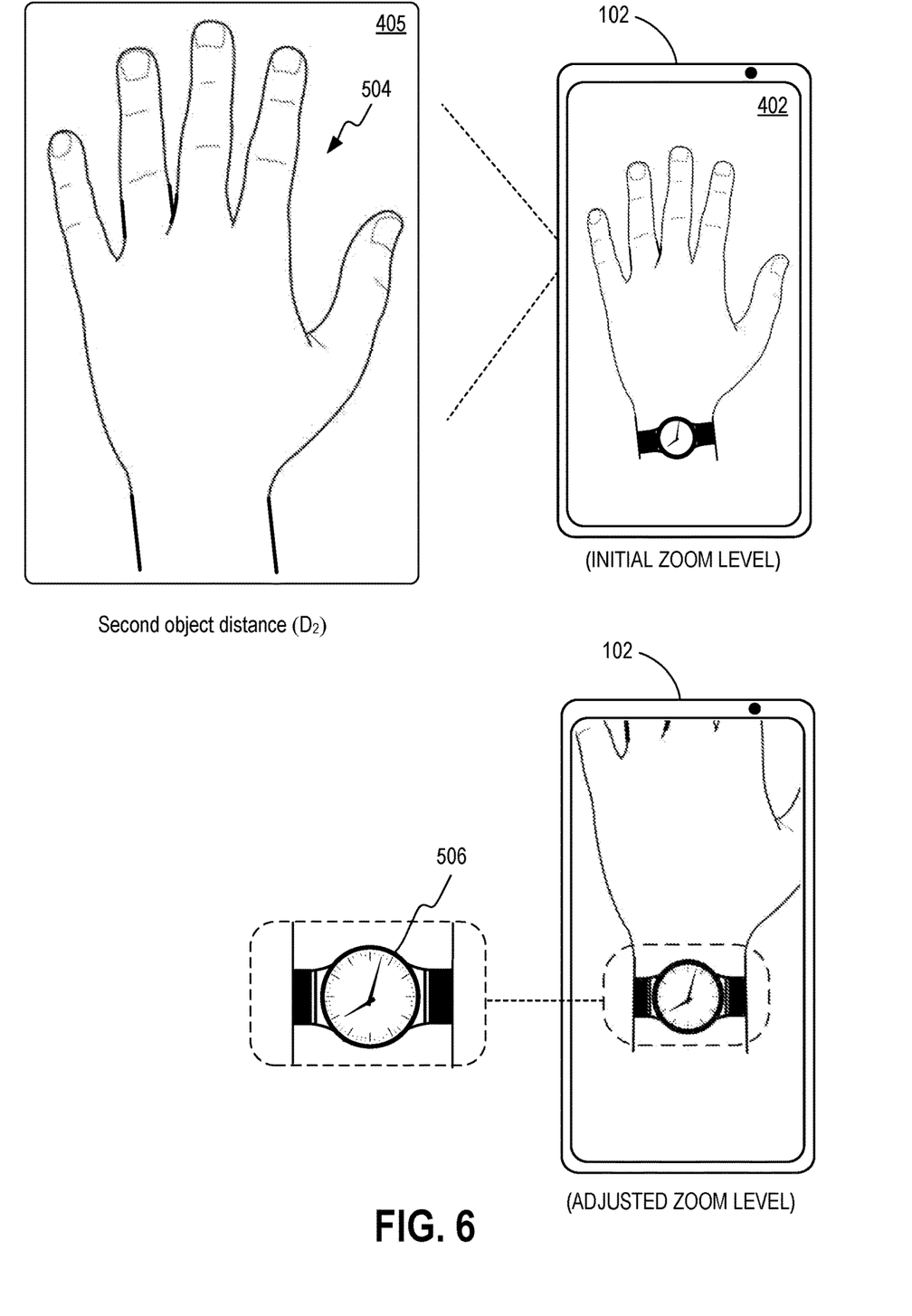
FIG. 6 illustrates the computing device of FIG. 1 performing automatic zoom adjustment based on the transitioning of the user's hand from the first object distance to the second object distance according to various embodiments of the present disclosure.

FIG. 6 illustrates the computing device 102 of FIG. 1 performing automatic zoom adjustment based on the transitioning of the user's hand 504 from the first object distance to the second object distance. In the example shown, an image 405 of the user' hand 504 taken by the camera is displayed on the user interface 402. When the object tracker 106 (FIG. 1) executing in the computing device 102 detects the change in positioning of the user's hand 504 (as shown in FIG. 5), the zoom level determiner 108 (FIG. 1) automatically transitions from the initial zoom level to an adjusted zoom level (e.g., increased zoom level). As shown in FIG. 6, the user is able to view finer details on the augmented reality object 506 shown in the user interface 402 due to the adjusted zoom level. Note, again, that the user simply repositions the user's hand 504 such that the second object distance ($D_2$) is less than the first object distance ($D_1$) where the user does not need to bring the hand 504 such that the fingers are outside the field of view of the camera in the computing device 102. Similarly, to decrease the zoom level, the user can reposition the user's hand to a distance greater than the current object distance. In this regard, the user is able to incrementally adjust the zoom level by moving the user's hand.

Figure 7:
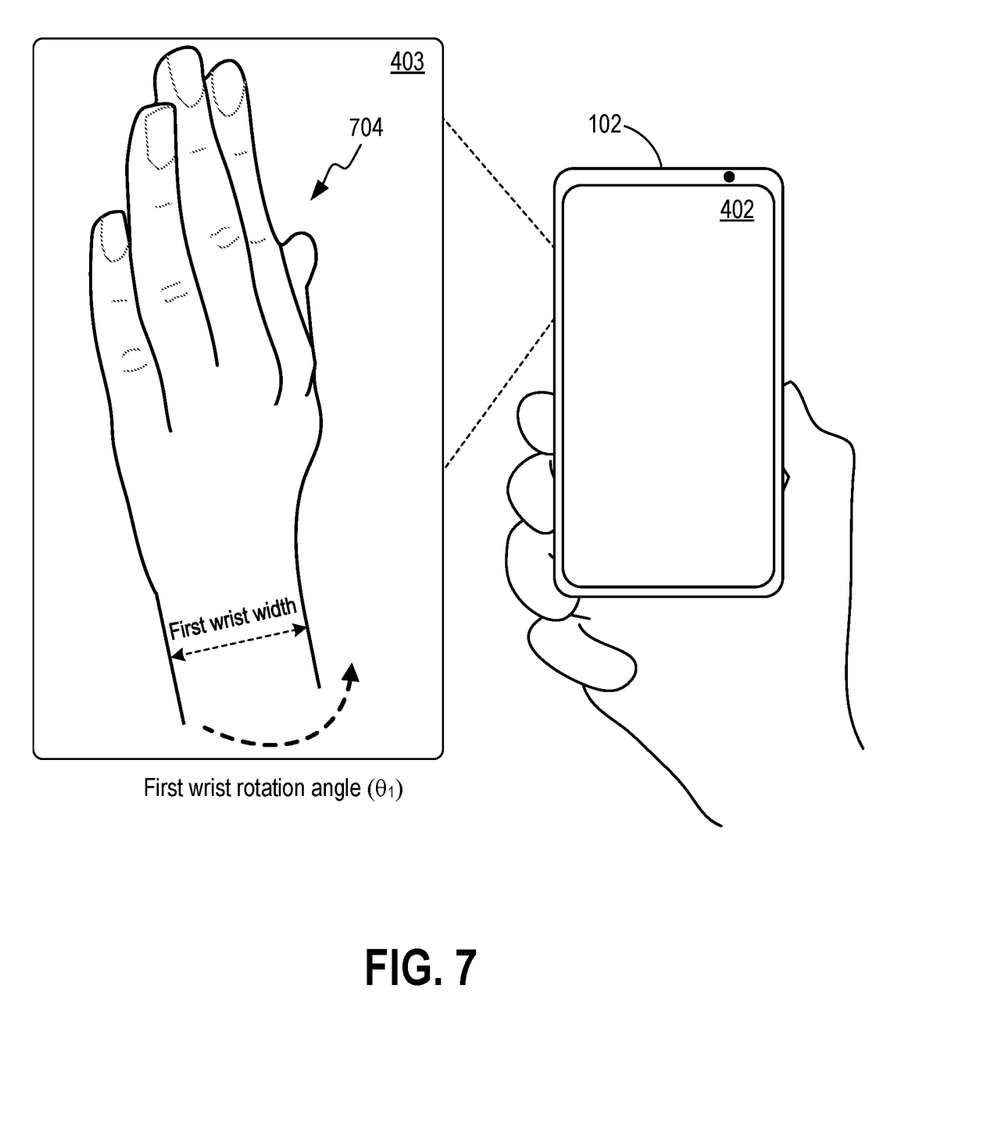
FIG. 7 illustrates the user adjusting the zoom level by transitioning the user's hand from a first wrist rotation angle to a second wrist rotation angle according to various embodiments of the present disclosure.
Figure 8:
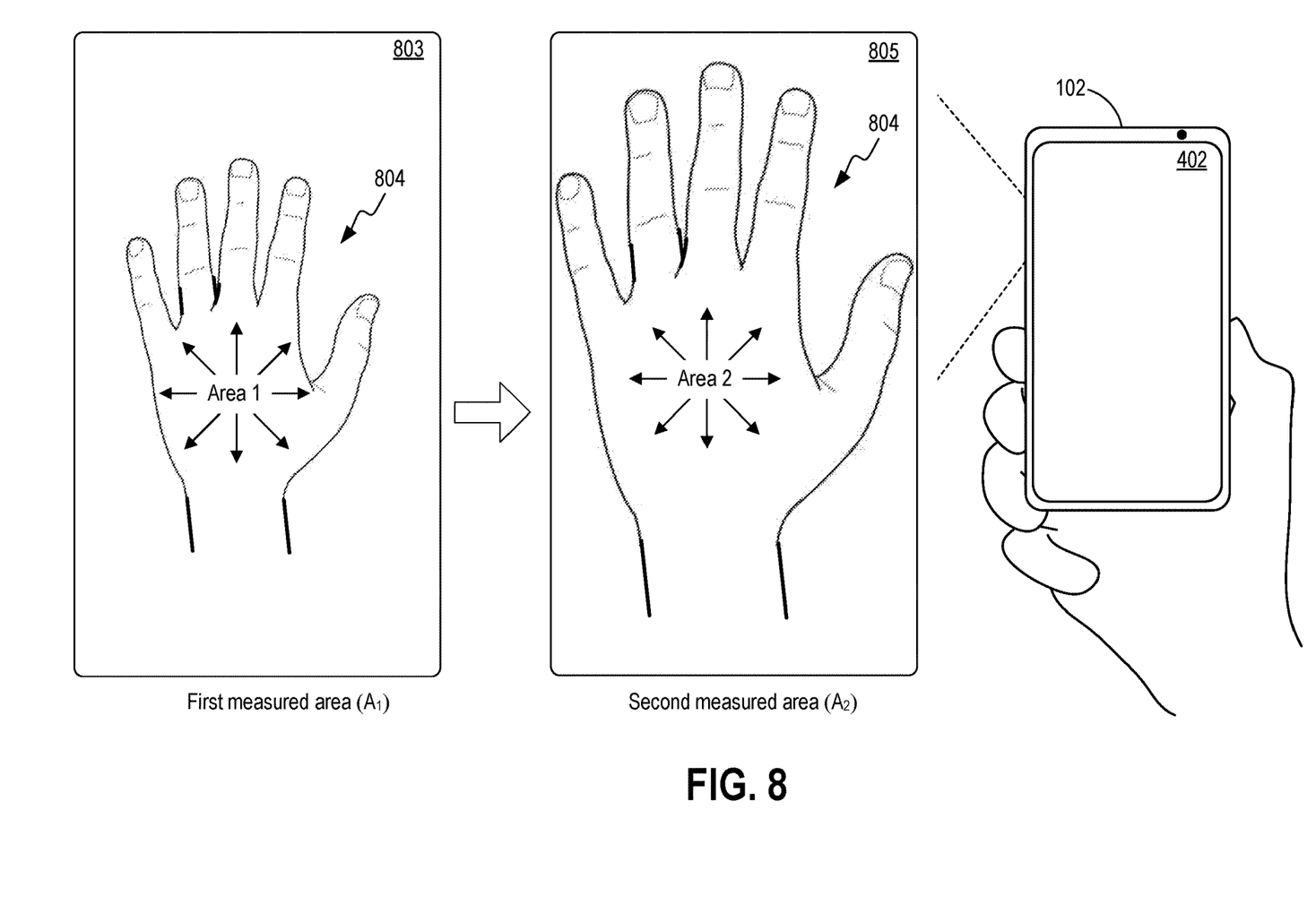
FIG. 8 illustrates the user adjusting the zoom level by transitioning the user's hand from a first position resulting in a first measured area of the hand to a second position

FIG. 7 illustrates the computing device 102 of FIG. 1 adjusting the zoom scale based on the width of the wrist and the size of the image. In the example shown, a camera of the computing device 102 obtains an image depicting a hand at an initial zoom scale and estimates a pose of the hand depicted in the image. The object tracker 106 (FIG. 1) executing in the computing device 102 obtains a size of the image, where the user's hand is positioned at a wrist rotation angle and the user's wrist having a first width. The object tracker 106 then determines a second width of the wrist according to the orientation of the wrist in the image and the first width of the wrist. The object tracker 106 then determines the distance between the hand and the camera of the computing device 102 based on a ratio of the second width of the wrist and the size of the image. The zoom level determiner 108 (FIG. 1) then adjusts the zoom scale based on the second width of the wrist and the size of the image. The image editor 110 (FIG. 1) renders an augmented reality object 706 on the hand depicted in the image according to the adjusted zoom scale and the pose of the hand depicted in the image. The object tracker 106 calculates the second width of the wrist based on the first width of the wrist. FIG. 8 illustrates the user adjusting the zoom level by transitioning the user's hand 704 from a first position resulting in a first measured area of the hand 804 to a second position resulting in a second measured area of the hand 804. In the example shown, two images 803, 805 of the user's hand are taken by the camera where the user's hand 804 is positioned at different distances from the camera. In accordance with some embodiments, the object tracker 106 (FIG. 1) executing in the computing device 102 is configured to measure the area of the hand 804 to determine whether to increase or decrease the zoom level. In the example shown, the user's hand is initially at a first position resulting in a first measured area ($A_1$). The user then repositions the user's hand 804 such that the second measured ($A_2$) is greater than the first measure area ($A_1$).

Figure 9:
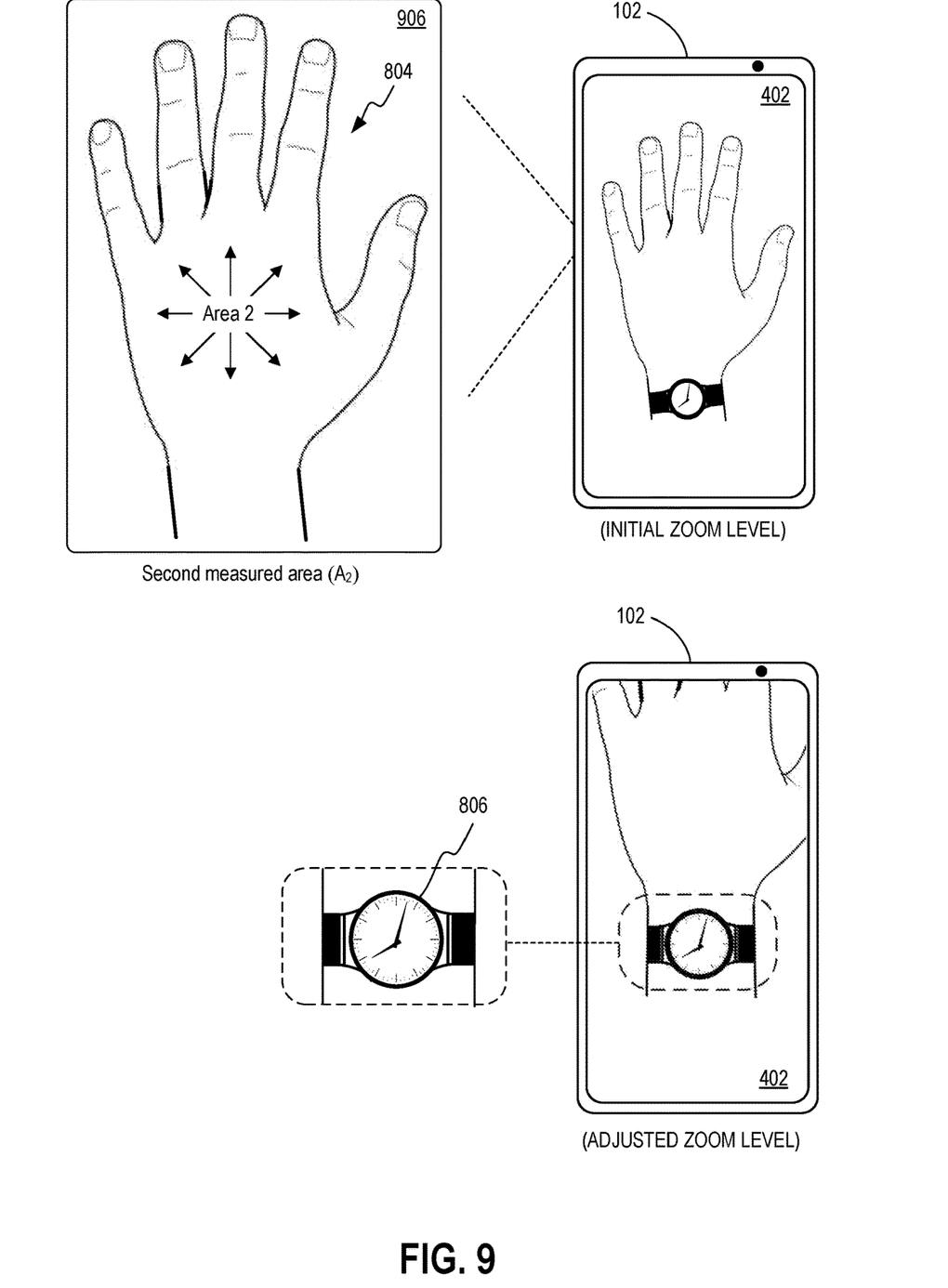
FIG. 9 illustrates the computing device of FIG. 1 performing automatic zoom adjustment based on the transitioning of the user's hand such that the second measured area is greater than the first measured area of the hand according to various embodiments of the present disclosure.

FIG. 9 illustrates the computing device 102 of FIG. 1 performing automatic zoom adjustment based on the transitioning of the user's hand such that the second measured area is greater than the first measured area of the hand 804. In the example shown, an image 906 of the user' hand 804 is taken by the camera where the user's hand 804 is positioned a certain distance from the camera. In accordance with some embodiments, the object tracker 106 (FIG. 1) executing in the computing device 102 is configured to measure the area of the hand 804 to determine whether to increase or decrease the zoom level. When the object tracker 106 (FIG. 1) executing in the computing device 102 detects the change in the measure area of the user's hand 804, (as shown in FIG. 9), the zoom level determiner 108 (FIG. 1) automatically transitions from the initial zoom level to an adjusted zoom level based on the measured area. As shown in FIG. 9, the user is able to view finer details on the augmented reality object 806 due to the adjusted zoom level. The user simply repositions the user's hand 804 such that a larger portion of the topside of the user's hand 804 is visible to the camera relative to the area visible at the previous positioning of the user's hand 804.

Note that the user can perform the positioning change of the hand 804 while keeping the hand 804 at approximately the same distance from the camera of the computing device 102. In particular, the user only needs to bring the user's hand 804 slightly closer to the camera to increase the zoom level. Similarly, the user only needs to move the user's hand 804 slightly away from the camera to decrease the zoom level. In this regard, the user is able to incrementally adjust the zoom level using a series of hand movements. For some embodiments, the zoom level determiner 108 (FIG. 1) increases the zoom level based on the first measured area ($A_1$) to the second measured area ($A_2$) in FIG. 8.

Figure 10:
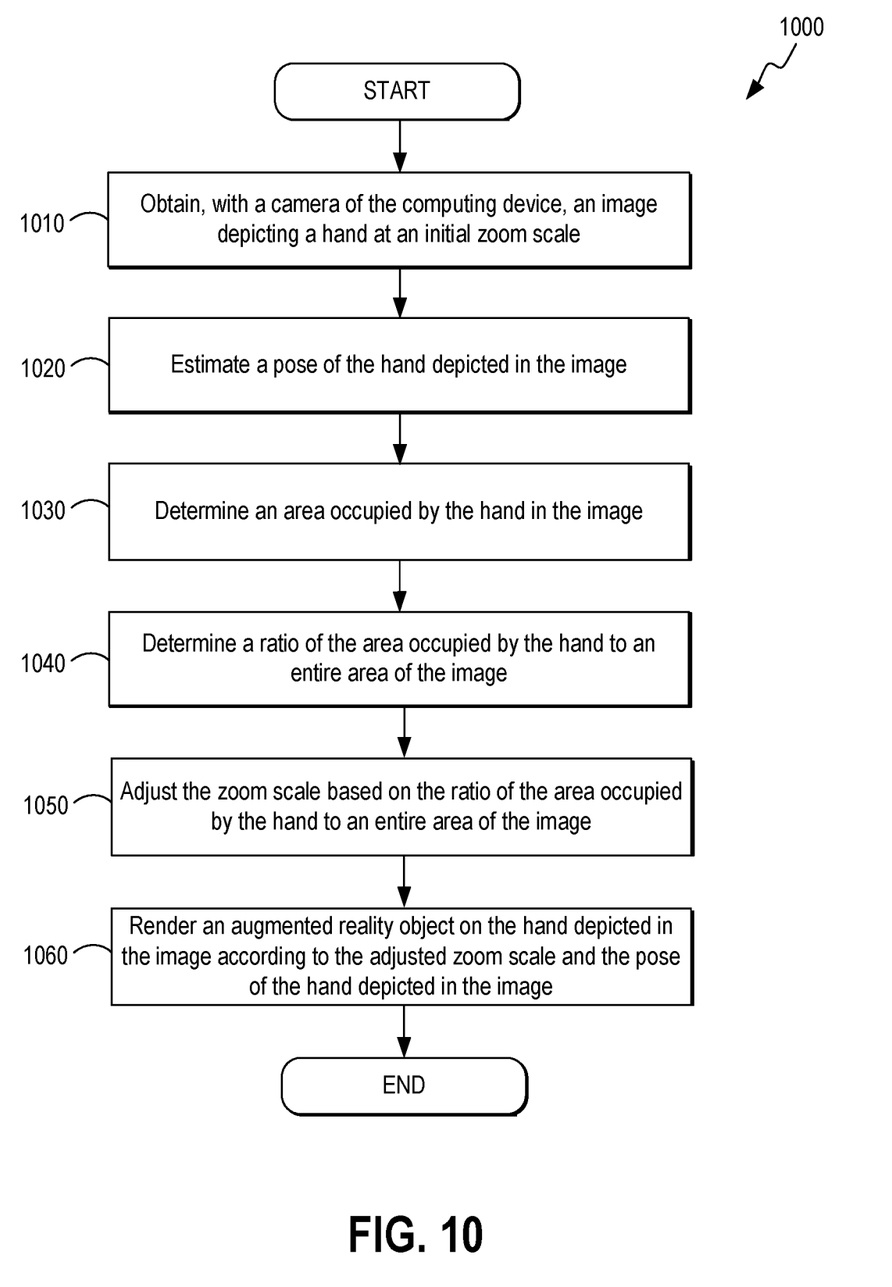
FIG. 10 is a top-level flowchart illustrating examples of functionality implemented as portions of the computing device of FIG. 1 for rendering an augmented reality object with adaptive zoom feature according to other embodiments of the present disclosure.

Reference is made to FIG. 10, which is a flowchart 1000 in accordance with other embodiments for rendering an augmented reality object with adaptive zoom feature, where the operations are performed by the computing device 102 of FIG. 1. It is understood that the flowchart 1000 of FIG. 10 provides merely an example of the different types of functional arrangements that may be employed to implement the operation of the various components of the computing device 102. As an alternative, the flowchart 1000 of FIG. 10 may be viewed as depicting an example of steps of a method implemented in the computing device 102 according to one or more embodiments.

Although the flowchart 1000 of FIG. 10 shows a specific order of execution, it is understood that the order of execution may differ from that which is displayed. For example, the order of execution of two or more blocks may be scrambled relative to the order shown. In addition, two or more blocks shown in succession in FIG. 10 may be executed concurrently or with partial concurrence. It is understood that all such variations are within the scope of the present disclosure.

At block 1010, the computing device 102 obtains with a camera of the computing device 102, an image depicting a hand at an initial zoom scale. At block 1020, the computing device 102 estimates a pose of the hand depicted in the image. At block 1030, the computing device 102 determines an area occupied by the hand in the image. At block 1040, the computing device 102 determines a ratio of the area occupied by the hand to an entire area of the image. At block 1050, the computing device 102 adjusts the zoom scale based on the ratio of the area occupied by the hand to an entire area of the image. At block 1060, the computing device 102 renders an augmented reality object on the hand depicted in the image according to the adjusted zoom scale and the pose of the hand depicted in the image. Thereafter, the process in FIG. 10 ends.

Figure 11:
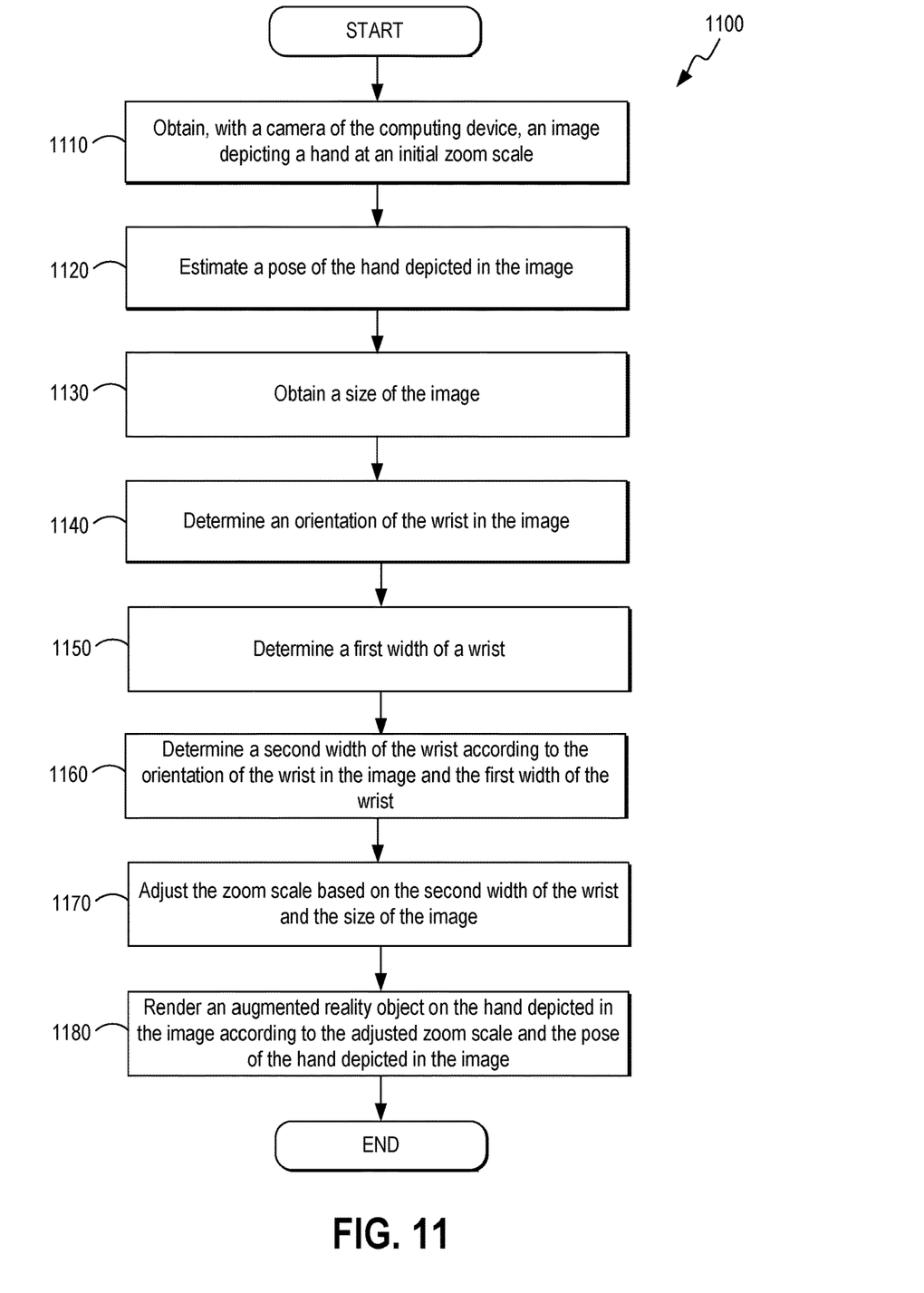
FIG. 11 is a top-level flowchart illustrating examples of functionality implemented as portions of the computing device of FIG. 1 for rendering an augmented reality object with adaptive zoom feature according to other embodiments of the present disclosure.

Reference is made to FIG. 11, which is a flowchart 1100 in accordance with yet other embodiments for rendering an augmented reality object with adaptive zoom feature, where the operations are performed by the computing device 102 of FIG. 1. It is understood that the flowchart 1100 of FIG. 11 provides merely an example of the different types of functional arrangements that may be employed to implement the operation of the various components of the computing device 102. As an alternative, the flowchart 1100 of FIG. 11 may be viewed as depicting an example of steps of a method implemented in the computing device 102 according to one or more embodiments.

Although the flowchart 1100 of FIG. 11 shows a specific order of execution, it is understood that the order of execution may differ from that which is displayed. For example, the order of execution of two or more blocks may be scrambled relative to the order shown. In addition, two or more blocks shown in succession in FIG. 11 may be executed concurrently or with partial concurrence. It is understood that all such variations are within the scope of the present disclosure.

At block 1110, the computing device 102 obtains, with a camera of the computing device 102, an image depicting a hand at an initial zoom scale. At block 1120, the computing device 102 estimates a pose of the hand depicted in the image. At block 1130, the computing device 102 obtains a size of the image. At block 1140, the computing device 102 determines an orientation of the wrist in the image. At block 1150, the computing device 102 determines a first width of a wrist. At block 1160, the computing device 102 determines a second width of the wrist according to the orientation of the wrist in the image and the first width of the wrist. At block 1170, the computing device 102 adjusts the zoom scale based on the second width of the wrist and the size of the image. At block 1180, the computing device 102 renders an augmented reality object on the hand depicted in the image according to the adjusted zoom scale and the pose of the hand depicted in the image. Thereafter, the process in FIG. 11 ends.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are included herein within the scope of this disclosure and protected by the following claims.

The invention claimed is:

1. A method implemented in a computing device, comprising:
    obtaining, with a camera of the computing device, an image depicting a hand at an initial zoom scale;
    estimating a pose of the hand depicted in the image;
    determining a distance between the hand and the camera of the computing device;
    adjusting the zoom scale based on the distance between the hand and the camera of the computing device, wherein adjusting the zoom scale based on the distance between the hand and the camera comprises adjusting the zoom scale to be inversely proportional to the distance between the hand and the camera;
    generating a modified image by cropping the image according to the adjusted zoom scale;
    rendering an augmented reality object on the hand depicted in the modified image according to the adjusted zoom scale and the pose of the hand depicted in the image; and displaying the modified image with the rendered augmented reality object.

2. The method of claim 1, wherein determining the distance between the hand and the camera comprises:
obtaining a size of the image;
determining a width of a wrist; and
determining the distance between the hand and the camera based on a ratio of the width of the wrist and the size of the image.

3. The method of claim 1, wherein determining the distance between the hand and the camera comprises:
obtaining a size of the image;
determining an orientation of a wrist in the image;
determining a first width of the wrist;
determining a second width of the wrist according to the orientation of the wrist in the image and the first width of the wrist; and
determining the distance between the hand and the camera based on a ratio of the second width of the wrist and the size of the image.

4. The method of claim 1, wherein determining the distance between the hand and the camera comprises:
determining an area occupied by the hand in the image; and
determining a ratio of the area occupied by the hand to an entire area of the image, wherein the zoom scale is adjusted based on the ratio.

5. The method of claim 1, wherein determining the distance between the hand and the camera comprises:
determining locations of two points on the hand in the image; and
determining a distance between the two points on the hand in the image, wherein the zoom scale is adjusted based on the distance between the two points on the hand in the image.

6. A method implemented in a computing device, comprising:
obtaining, with a camera of the computing device, an image depicting a hand at an initial zoom scale;
estimating a pose of the hand depicted in the image;
determining a distance between the hand and the camera of the computing device;
adjusting the zoom scale based on the distance between the hand and the camera of the computing device, wherein adjusting the zoom scale based on the distance between the hand and the camera comprises adjusting the zoom scale to be inversely proportional to the distance between the hand and the camera; and
rendering an augmented reality object on the hand depicted in the image according to the adjusted zoom scale and the pose of the hand depicted in the image, wherein rendering the augmented reality object on the hand in the image according to the adjusted zoom scale and the pose of the hand in the image comprises:
rendering the augmented reality object on the hand in the image according to the pose of the hand in the image;
generating a modified image by cropping the image with the rendered augmented reality object according to the adjusted zoom scale; and
displaying the modified image with the rendered augmented reality object.

7. A method implemented in a computing device, comprising:
obtaining, with a camera of the computing device, an image depicting a hand at an initial zoom scale;
estimating a pose of the hand depicted in the image;
determining an area occupied by the hand in the image;
determining a ratio of the area occupied by the hand to an entire area of the image;
adjusting the zoom scale based on the ratio of the area occupied by the hand to an entire area of the image; and
rendering an augmented reality object on the hand depicted in the image according to the adjusted zoom scale and the pose of the hand depicted in the image.

8. A method implemented in a computing device, comprising:
obtaining, with a camera of the computing device, an image depicting a hand at an initial zoom scale;
estimating a pose of the hand depicted in the image;
obtaining a size of the image;
determining an orientation of a wrist in the image;
determining a first width of the wrist;
determining a second width of the wrist according to the orientation of the wrist in the image and the first width of the wrist;
adjusting the zoom scale based on the second width of the wrist and the size of the image; and
rendering an augmented reality object on the hand depicted in the image according to the adjusted zoom scale and the pose of the hand depicted in the image.

9. A system, comprising:
a camera;
a memory storing instructions;
a processor coupled to the memory and configured by the instructions to at least:
obtain, with the camera, an image depicting a hand at an initial zoom scale;
estimate a pose of the hand depicted in the image;
determine a distance between the hand and the camera of the system;
adjust the zoom scale based on the distance between the hand and the camera of the system, wherein adjusting the zoom scale based on the distance between the hand and the camera comprises adjusting the zoom scale to be inversely proportional to the distance between the hand and the camera;
generate a modified image by cropping the image according to the adjusted zoom scale;
render an augmented reality object on the hand depicted in the modified image according to the adjusted zoom scale and the pose of the hand depicted in the image; and
display the modified image with the rendered augmented reality object.

10. The system of claim 9, wherein the processor is configured to determine the distance between the hand and the camera by:
obtaining a size of the image;
determining an orientation of a wrist in the image;
determining a first width of the wrist;
determining a second width of the wrist according to the orientation of the wrist in the image and the first width of the wrist; and
determining the distance between the hand and the camera based on a ratio of the second width of the wrist and the size of the image.

11. The system of claim 9, wherein the processor is configured to determine the distance between the hand and the camera by:
determining an area occupied by the hand in the image; and determining a ratio of the area occupied by the hand to an entire area of the image, wherein the zoom scale is adjusted based on the ratio.

12. The system of claim 9, wherein the processor is configured to determine the distance between the hand and the camera by:
   determining locations of two points on the hand in the image; and
   determining a distance between the two points on the hand in the image, wherein the zoom scale is adjusted based on the distance between the two points on the hand in the image.

13. A non-transitory computer-readable storage medium storing instructions to be implemented by a computing device having a processor, wherein the instructions, when executed by the processor, cause the computing device to at least:
   obtain, with a camera of the computing device, an image depicting a hand at an initial zoom scale;
   estimate a pose of the hand depicted in the image;
   determine a distance between the hand and the camera of the computing device;
   adjust the zoom scale based on the distance between the hand and the camera of the computing device, wherein adjusting the zoom scale based on the distance between the hand and the camera comprises adjusting the zoom scale to be inversely proportional to the distance between the hand and the camera;
   generate a modified image by cropping the image according to the adjusted zoom scale;
   render an augmented reality object on the hand depicted in the modified image according to the adjusted zoom scale and the pose of the hand depicted in the image; and
   display the modified image with the rendered augmented reality object.

14. A system, comprising:
   a camera;
   a memory storing instructions;
   a processor coupled to the memory and configured by the instructions to at least:
      obtain, with the camera, an image depicting a hand at an initial zoom scale;
      estimate a pose of the hand depicted in the image;
      determine a distance between the hand and the camera of the system;
      adjust the zoom scale based on the distance between the hand and the camera of the system, wherein the processor is configured to adjust the zoom scale based on the distance between the hand and the camera by adjusting the zoom scale to be inversely proportional to the distance between the hand and the cameras; and
      render an augmented reality object on the hand depicted in the image according to the adjusted zoom scale and the pose of the hand depicted in the image, wherein the processor is configured to render the augmented reality object on the hand in the image according to the adjusted zoom scale and the pose of the hand in the image by:
         rendering the augmented reality object on the hand in the image according to the pose of the hand in the image;
         generating a modified image by cropping the image with the rendered augmented reality object according to the adjusted zoom scale; and
         displaying the modified image with the rendered augmented reality object.

* * * * *